United States Patent [19]

Goron et al.

[11] Patent Number: 4,986,911
[45] Date of Patent: Jan. 22, 1991

[54] DEWATERING PROCESS AND APPARATUS

[75] Inventors: John Goron, Bridgewater; Ronald G. Renza, Middlesex; Robert J. Crosby, Bridgewater; Erich W. Sodtalbers, Washington, all of N.J.

[73] Assignee: Komline-Sanderson Engineering Corporation, Peapack, N.J.

[21] Appl. No.: 382,279

[22] Filed: Jul. 20, 1989

[51] Int. Cl.⁵ .............................................. B01D 33/68
[52] U.S. Cl. .................................... 210/396; 210/400; 210/456
[58] Field of Search ............... 210/396, 400, 783, 456; 15/256.5; 172/169, 522, 604

[56] References Cited

U.S. PATENT DOCUMENTS

| | | | |
|---|---|---|---|
| 465,497 | 12/1891 | Randall | 172/522 |
| 3,984,329 | 10/1976 | Wenzel et al. | 210/396 |
| 4,354,935 | 10/1982 | Austin et al. | 210/396 |
| 4,602,998 | 7/1986 | Goron | 210/396 |
| 4,609,467 | 9/1986 | Morales | 210/396 |
| 4,729,836 | 3/1988 | Ickinger et al. | 210/396 |
| 4,857,193 | 8/1989 | Clements et al. | 210/396 |
| 4,879,033 | 11/1989 | Rich | 210/396 |

FOREIGN PATENT DOCUMENTS 1033 of 1863 United Kingdom ................ 172/522

Primary Examiner—W. Gary Jones
Assistant Examiner—Matthew O. Savage
Attorney, Agent, or Firm—Watson, Cole, Grindle & Watson

[57] ABSTRACT

Apparatus for enhancing dewatering of sludge on a filter belt by the use of conical plows that elevate and mix the sludge. The angles of the plows with the horizontal may be progressively increased, and thereby increase elevation and mixing of the sludge as it moves downstream on the belt toward discharge position.

13 Claims, 4 Drawing Sheets

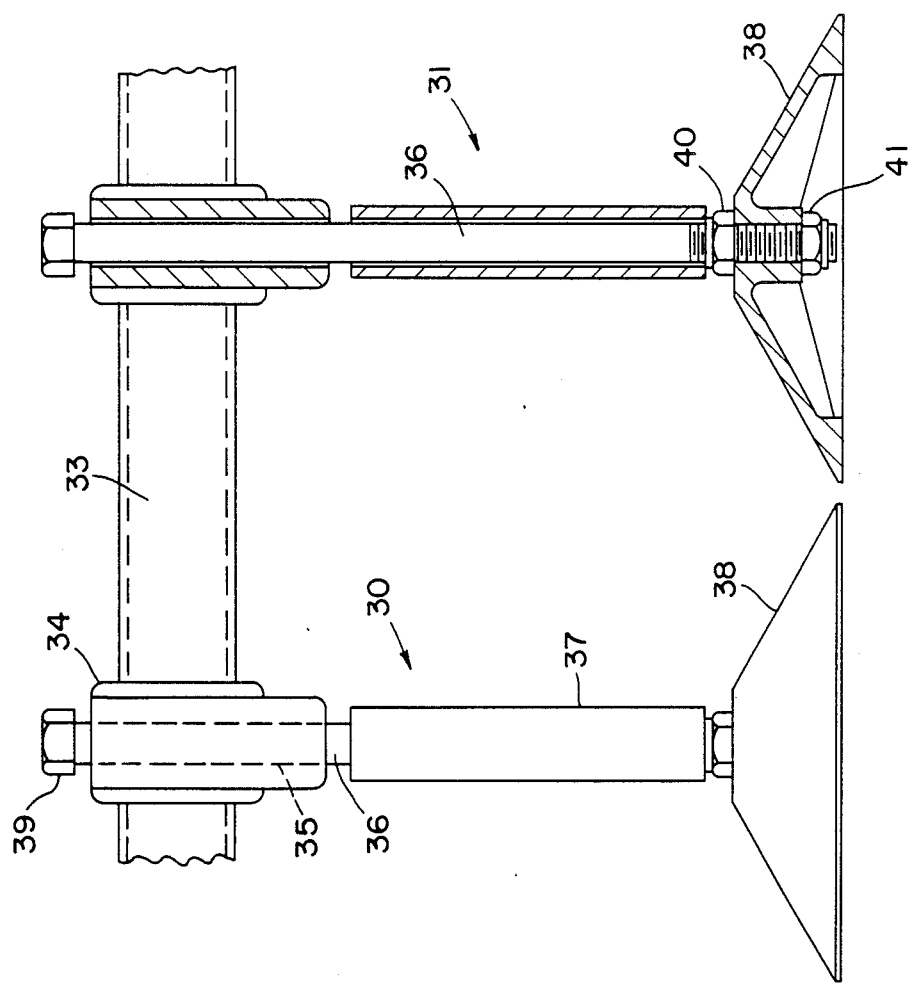

DEWATERING PROCESS AND APPARATUS

The present invention relates generally to the field of separating the liquid phase from the solid phase of a sludge or slurry. This separation is hereinafter referred to as "dewatering." Generally, the sludge or slurry, hereinafter jointly referred to as "sludge," is deposited on and travels with a flight of an endless filter media with the liquid phase draining by gravity through the media and the solid phase traveling with the media to the point of discharge from the gravity dewatering part of the filtration equipment.

More specifically, this invention relates to a sludge dewatering system in which an array of sludge flow elevating devices ride at or on the surface of the filter media and cause the creation of multi-directional eddy mixing zones, i.e., currents of water and/or air running other than with the main currents, which greatly facilitate the separation of the liquid phase from the solid phase of the sludge.

BACKGROUND

In general, the use of plows to improve water drainage from sludge carried on an endless conveyor belt has been recognized to be advantageous. Thus, in U.S. Pat. No. 4,609,467, which is commonly assigned to the assignee of the present application, plows are disclosed which extend into the longitudinal path of movement of the belt and are rotatable in order to minimize hang-up of fibrous materials that may be undesirably retained on other, conventional plows. In that patent, the rotatable plows descend into the path of the sludge and thereby distribute the sludge evenly over the face of the belt while at the same time scraping or wiping the top surface of the belt to provide exposed filter media portions. Thereafter, existing free liquid flows by the force of gravity from the sludge to and through the liquid permeable belt on which the sludge is carried. The liquid is then collected and further treated or discharged in the course of the waste management program. The solids remaining in the sludge then pass to other apparatus for further treatment, such as a press section of a belt filter press.

Still another patent which constitutes prior art and is commonly assigned is U.S. Pat. No. 4,602,998, which describes a device for raising a plow assembly such that the plows may be lifted out of the path of the sludge on the belt in case that sludge contains fibrous materials that adhere to the plows and thereby inhibit their distribution and scraping function. Such an apparatus is definitely advantageous in order to remove fibrous or stringy material that may become entangled with the plows, as well as for general cleaning purposes. Indeed, the apparatus and function of the invention disclosed in the latter patent, i.e., facile raising of the plows out of the path of sludge, is advantageously utilized in conjunction with the presently disclosed apparatus.

The invention disclosed herein advances the concepts and structures contained in these two patents, as well as other patents directed to plows or flow breakers, such as U.S. Pat. No. 3,984,329, and greatly improves the capability of plows to facilitate the separation of liquid from a two-phase, solid-liquid mixture, or from a sludge that is being carried on a permeable filter belt. This is accomplished by creating a series of flow elevation zones with the creation of multi-directional eddy currents to improve mixing over essentially the entire surface of the permeable filter belt that is in contact with the sludge. The solids-liquid mixture is caused to form a turbulent layer covering all or a large part of the filter belt surface which, because of the characteristics of the turbulent layer, greatly increases the rate of filtration, or drainage, of the liquid from the sludge.

As the sludge initially is deposited upon the belt, an excess of free water begins to draw through the filter media carrying with it to the top surface of the media light floc and fines which tend to cover the top of the media and block or prevent maximum drainage. The first row of plows, when positioned properly, wipes the filter media and lifts and gently disturbs the light surface floc, thereby enhancing drainage and allowing the floc to build. As the sludge continues to travel toward the discharge end of the belt, additional liquid drains off and at each subsequent contact of plows of greater angle encounter increased resistance causing the sludge mass to build and at the same time releasing more liquid. Eventually the mass may become so great that upon engaging a plow of sufficiently large angle it is caused to roll over on itself laterally and longitudinally, thereby impinging and falling on oncoming sludge driving out additional liquid.

Where this phenomenon of the sludge causing mixing eddies to occur and even rolling back on itself in some instances, takes place at multiple locations along the length of the filter belt in the longitudinal direction, it has been determined that the solids content of sludge carried by the belt, without pressure being exerted on that sludge and without a vacuum being drawn from beneath the belt, can be increased up to nine-fold. This can be accomplished by the expedient of using plows according to the present invention and spacing and varying those plows in a manner so as to produce optimal results. As will be apparent to those of skill in the art, such spacing and number of plows utilized, either in a concentrated arrangement at the discharge end or a distributed arrangement along the length of the filter media, will be dependent, inter alia, on the type of sludge being dewatered, the rate of feed of the sludge onto the filter belt, and the solids content desired in the filter cake that is discharged from the filter media.

Accordingly, it is an important object of the present invention to provide an overall plow assembly system in which by a combination of the shape of the plows, the spacing of the plows, and variations in the plows, themselves, as those plows are situated in the path of the sludge carried on a filter media, a highly effective gravitational dewatering of the sludge is achieved.

It is another object of the present invention to provide a plow assembly in which the spacing of the plows, the shape of the plows, and other factors can easily be varied in order to achieve optimum dewatering. It is another object of the invention to provide individual plows of an optimal shape, themselves, so that by use of such plows flow elevation zones are created with the multi-directional eddy mixing that gives rise to maximum water release from the sludge.

SUMMARY OF THE INVENTION

In one embodiment of the present invention, a plow assembly is provided for elevating and mixing a body of sludge on a liquid permeable belt, which assembly includes a plow in the general form of a cone. The cone has a vertical axis and is located with the plane of the base of the cone at or in direct contact with the liquid permeable belt; the cone has a side wall extending upwardly and inwardly away from the belt. The plow is positioned on the belt so that as the flight of the belt moves past the plow, the sludge thereon will rise at least partially up the side wall of the conical plow, thereby elevating and disturbing the flow of the sludge, and agitating and mixing it to increase the flow of liquid from the sludge to the filter media, and then through the filter media to a location where it can be collected. Preferably, the cone is a right circular cone.

These plows are preferably used in multiples, in accordance with preferred embodiments of the present invention. Thus, normally there will be a row of such conical plows extending across the width of the belt, preferably with their vertical axes in substantial alignment. It has also been found advantageous to have not simply one row of plows, but multiple rows of plows extending across the width of the filter media, for example, with the axes of the plows of one row being followed by a row with its axes in the gaps between the axes of the plows of the next row. In this manner a plurality of rows of plows can be arranged to form a cooperating group of plows in order still further to increase the extent of the flow elevation zones. Alternatively, rows of plows may simply be spaced along the length of the filter belt.

Another feature of the present invention resides in a plow assembly that comprises at least two rows of plows spaced longitudinally along the length of the flight of belt, with each plow being in the form of a cone the side walls of which slope to form an angle with the plane of the base of the plow. Cones of lesser slope, i.e., cones having side walls which form a lesser angle with the plane of the base of the plow may be provided at upstream locations of the belt, by which term we refer to those portions of the belt nearer the point where sludge is discharged onto the media. As the sludge on the belt moves downstream toward the discharge end of the filter media flight, the angle formed by the side wall and the base of the conical plows may be increased. Such increase results in more intense multi-directional eddy mixing being presented to the sludge, because as the solids concentration of the sludge has been increased, greater flow elevation and more intense mixing will be required to free additional liquid from the sludge mass. Exemplarily, such angles may be increased from 15° to 30° from upstream to downstream locations along the path of the filter media, and where groups of plows are utilized, the plows of each group can be formed with the same side wall slope in order to effect the desired concentration of the solids of the sludge.

In another aspect, the present plow assembly comprises means for mounting a plow in the general form of a cone extending into the flow of sludge carried by a filter belt flight. The mounting means comprises a post extending horizontally across and above the path of movement of the belt, and a collar mounted on the post, which collar defines an elongated orifice the axis of which is substantially vertical when the plow is in flow elevating and multi-directional eddy mixing position. A shaft is positioned within the orifice of the collar and has a diameter slightly less than the diameter of the orifice, so that the shaft may rotate within the orifice and also move axially therewithin. A plow is mounted at the lower end of the shaft, so that in sludge-contacting position the plow depends substantially vertically from the collar and is at or in contact with the belt. The plow is preferably maintained in fixed position relative to the shaft, with a stop means provided at the top of the shaft above the orifice, to delimit downward movement of the shaft and plow.

In a more preferred embodiment, plow assemblies are mounted along the horizontal post, so that there are a series of collars extending transversely to the belt. The spacing of the collars is such that the conical plows are positioned closely adjacent to each other. In such position, sludge passing along the belt will be forced between and up the side walls of the plows, which are movable, in rotary and axial directions, in accordance with movement of the shaft. Further, the horizontal post and the plows carried by it are subject to vertical movement out of the path of the sludge on the belt.

The process form of our invention will also be summarized. It comprises a process for dewatering sludge on a flight of a foraminous filter belt that moves longitudinally between sludge deposit and discharge positions. In our process, sludge is deposited on the flight, which is then moved in a longitudinal direction to a position where, initially, the sludge is elevated and mixed as it is carried by the belt. Thereafter, the sludge is again elevated and mixed on the belt, but to a greater extent than the initial elevation and mixing. Thereafter, the sludge is discharged from the belt flight. Indeed, the sludge can undergo a third, and subsequent elevations and mixings; where there are three such elevations and mixings, each one will be to an extent greater than the preceding elevation and mixing. The sludge can be elevated and mixed to an extent such that it falls back upon itself to expose interior sludge portions.

These and other objects, features and advantages of the present invention will become more fully apparent from a description of a preferred embodiment of the invention as disclosed more fully hereinafter in conjunction with the accompanying drawings, in which:

BRIEF DESCRIPTION OF THE DRAWINGS

FIG. 3 is an enlarged side elevational view, partly in section, showing a preferred mounting of plow assemblies in operable position on a filter belt.

DESCRIPTION OF PREFERRED EMBODIMENTS

Figure 1:
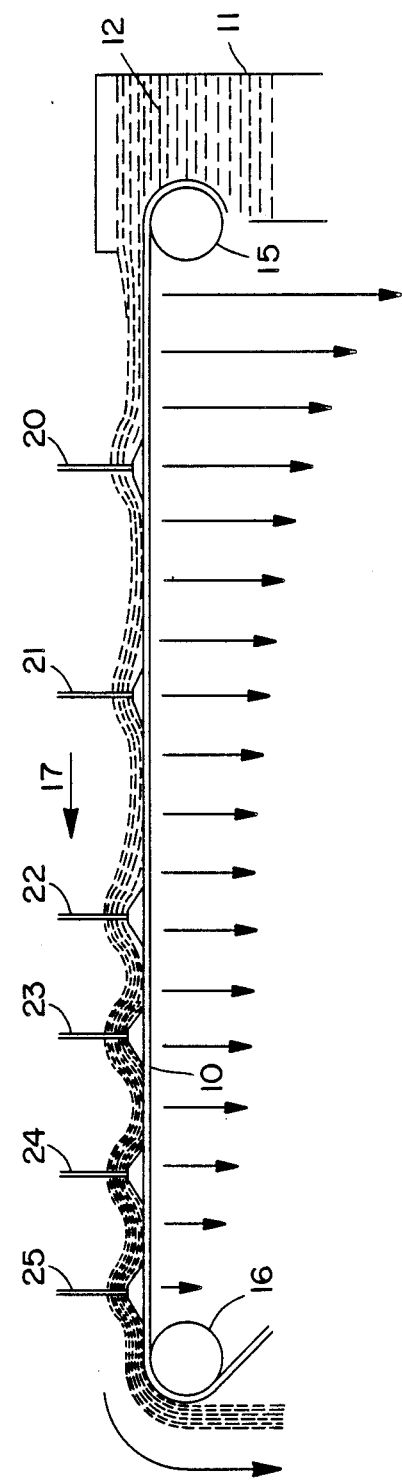
FIG. 1 is a schematic, side elevational view of a flight of an endless filter belt with plow assemblies positioned on it at preferred locations.
Figure 2:
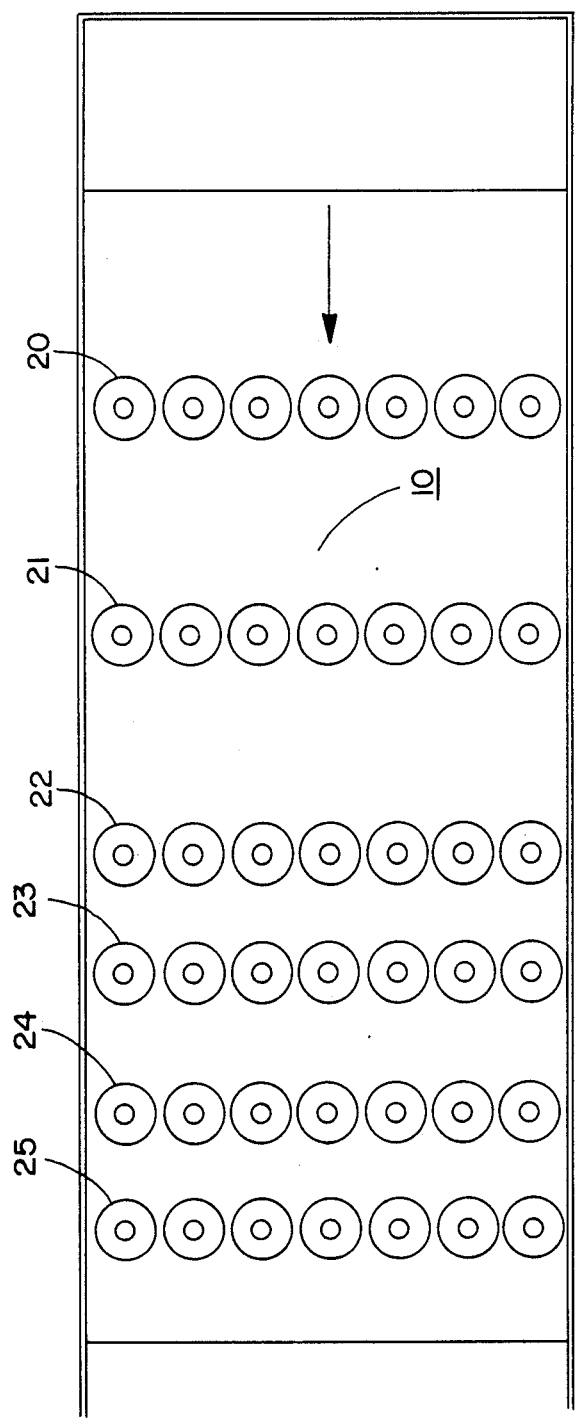
FIG. 2 is a top plan view of the belt and plow assembly of FIG. 1, also in schematic form.
Figure 4A:
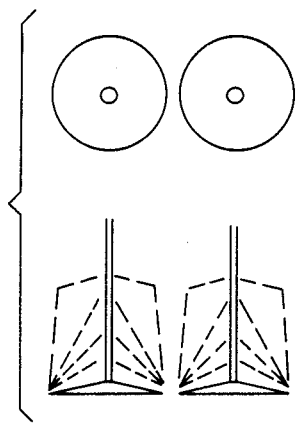
FIG. 4 illustrates configurations of various forms of plows.
Figure 4B:
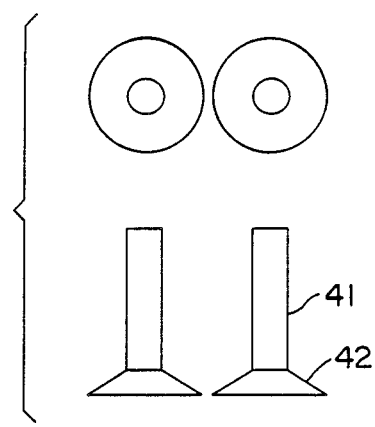
Figure 4C:
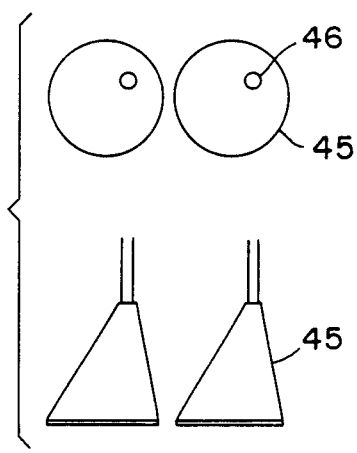
Figure 4D:
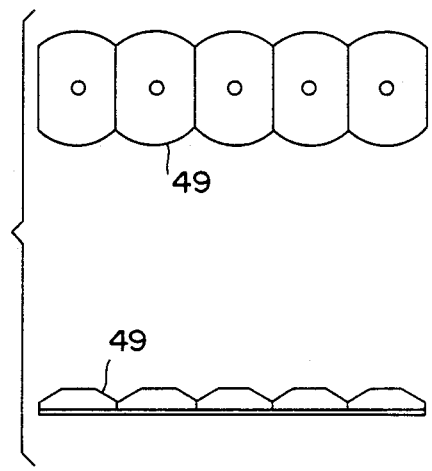

Referring now to the drawings, and in particular to FIGS. 1 and 2 thereof, the horizontal flight 10 of an endless filter belt is shown in both views. As seen best in FIG. 1, a feed hopper 11 accumulates sludge 12 having a high liquid content. As sludges are measured in solids content, that content may typically be from one quarter to one percent (or more) solids. Flight 10 of the filter media is shown extending between rollers 15 and 16, which guide rollers rotate in a counter-clockwise direction so that the flight moves in the direction indicated by arrow 17. As guided by rollers 15 and 16, the flight 10 accumulates slurry or sludge 12 from feed hopper 11, which is deposited on the flight. The slurry then passes on the foraminous belt and, in the particular embodiment illustrated, contacts an upstream row of conical plows 20. Thereafter, the belt transports sludge to a second, more downstream row of plows 21, and thence, in sequence, to more downstream located rows 22, 23, 24 and 25. After passing by the row of plows 25, the sludge is then discharged into a suitable receptacle as the belt flight 10 passes about discharge roller 16 in a conventional manner.

The structure of an individual plow and the means by which the plow is mounted for operation are seen in a preferred mode in FIG. 3. Two plows are shown in FIG. 3, the plow 30 to the left being shown in side elevation and the plow 31 to the right being seen in vertical section. From FIG. 3 it will be apparent that the elements of the plow and its mounting means comprise a horizontal post 33, which can be circular or square in cross-section, extends across the width of the belt, and is suitably mounted in side walls or other conventional structure located on either side of the belt flight 10. As so mounted, post 33 extends across the belt and the sludge carried on the belt, and carries support structure for maintaining the conical plows in position to dewater the slurry or sludge carried on the belt.

As seen in FIG. 3, a collar 34 is firmly fixed to the post 33. Collar 34 forms an interior, extended orifice 35. Extending within orifice 35 is a shaft 36 which terminates at one end in plow 38 and at the other end in a shaft head 39 that extends above the collar 34. There is a short length of shaft 36 between the top of the collar 34 and the bolt 39 to permit vertical movement of plow assembly 30. At its lower end, as best seen in the sectional view of the plow assembly 31, shaft 36 terminates downwardly in a nut 40 located above the conical plow 38 and a lock nut 41 that i located below the shell of the conical plow 38. In this manner, as mounted between nuts 40 and 41 at the lower end of shaft 36, the conical shell of plow 38 is firmly fixed on the shaft 36 so that the plow can only move in conjunction with shaft 36.

As so mounted, since the shaft 36 has a diameter slightly less than the diameter of orifice 35 of collar 34, shaft 36 is free to rotate within collar 34. Further, shaft 36 is free to move in a generally vertical direction within the orifice 35. Motion in a downward direction by shaft 36 is limited by shaft head 39 affixed to the upper end of the shaft so that, for example, if the filter media 10 is removed for cleaning or repair, the plows 38 will move downward for a relatively short distance and will still be positioned so that on replacement of the filter media the plows will be in their proper position for dewatering sludge or slurry on the media.

The plow assembly illustrated in FIG. 3, also includes an elongated sleeve that encloses the shaft 36. In operative position sleeve 37 has its axis vertically disposed and is freely rotatable independently of any movement of the shaft 36. Use of such a sleeve acts to avoid hang-up of fibrous or other materials on shaft 36, since when there is any such tendency for material to adhere to shaft 36, the presence of a light rotatable sleeve will permit rotation and movement of the material past the sleeve and, therefore, the shaft.

In order to move the plows upwardly so that they can be cleaned, repaired, or replaced, we prefer to use the apparatus disclosed and claimed in the aforesaid U.S. Pat. No. 4,602,998, entitled Raisable Plow Assembly.

It is an important feature of the present invention that, because these plows are substantially or generally conical, by the use of which term it is intended to include variants thereof, including what might be considered frusto-conical, the side walls or shells of the plows of the present invention have a slope that forms an angle with the plane of the base of the plow. The term, base, is used wherever the plow has a closed base or, as shown in the preferred embodiment, where the base of the plow is left open so that access may be had to the lock nut 41 in case it is desired to remove the plow. By providing such ease of access, it is not a difficult matter to change plows, so that a plow having one slope and forming a corresponding angle with the plane of its base may be easily replaced by a plow having a different slope and therefore having its shell form a different angle with the plane of its base.

Shown herein in FIG. 4 in top plan and side elevations are several variants of cones that may be used in accordance with the present invention to elevate and mix sludge carried on a filter belt. In FIG. 4A are cones having side walls that vary between slightly greater than 0° and approaching but less than 90° angles with the horizontal. In FIG. 4B are plows where the frustum of a plow is then joined to a circular right cylinder, the cylinder being designated by numeral 41, mounted atop the frustum of circular right cone 42. Shown in FIG. 4C are two general cones 45 with offset axes 46. In FIG. 4D are shown a series of convoluted conical sections 49. Such sections are spaced closely together as shown in top plan view in FIG. 4D, and are not rotatable.

While the use of any specific plows will depend on the particular sludge being dewatered, the rate of deposit of the sludge on the filter belt, and the structure of the filter media, it has been found advantageous to increase the slope and corresponding angle, and thereby provide progressively greater flow elevation and more intense multi-directional eddy mixing to the sludge between, over and around the conical plows, in the downstream direction of the media. At this time a preferred embodiment of my invention, as shown in FIGS. 1 and 2, is to employ in rows 20 and 21 plows that have a lower profile, i.e., plows the side walls of which form a lesser angle with the planes of their bases. Then, in rows 22, 23, 24 and 25, we employ plows having a higher profile, which means that the slope of the side walls of those plows is greater than the slope of the side walls of the plows in rows 20 and 21. In this manner, the sludge will be subjected to less agitation when it has a copious supply of water which is relatively facile to liberate through the foraminous media, yet be subjected to greater flow elevation and multi-directional eddy mixing when such is necessary in order to extract liquid from the slurry when the solids content of the slurry is higher. Indeed, at the group of plows in row 25, the slope of the side walls of the plows is such as to cause the sludge to tumble back upon itself before it can pass over and between the plows of that row.

With regard to the specific slopes of the plow shells, it is presently preferred that the lower profile plows have an axis, i.e., maintain a distance of three quarters of an inch between the base of the plow and the upward termination of the plow just below nut 40, which plow portion might be termed its frustum. In a higher profile plow, that vertical dimension has been preferred to be one and one-half inches. Since the plows are six inches in diameter at their bases, in this preferred embodiment the low profile plows, rows of which are located upstream in the direction of flow of sludge on the belt, have angles of approximately 15° with the horizontal; the higher profile plows located downstream in the path of movement of the belt have side walls that make angles of approximately 30° with the bases of the plows. As the plows are mounted, all of the plows are free to float on the belt and, in preferred form, ride directly on the belt, perhaps separated by a thin layer of sludge that may adhere to the upper surface of the belt.

By means of the present invention, markedly superior solids contents of sludges have been obtained. In one instance, where sludge 12 in a feed hopper 11 was deposited on a belt filter at a flow rate of approximately 425 gallons per minute, the sludge as so deposited had from one quarter percent to one percent solids content. Sludge discharged from the belt was obtained varying between five and nine percent solids. Only gravity drainage through the permeable belt, assisted by the flow elevation and eddy mixing from rows of first low profile, then moderate profile plows of conical shape, was utilized.

As a variant of the rows of plows illustrated in FIGS. 1 and 2, use has also been made of rows that are closely adjacent to each other along the longitudinal dimension of the belt. In such an instance, rather than having the plows aligned in the direction of flow of the sludge, the rows were staggered so that the gaps between adjoining plows in one row, e.g., row 22, would be occupied by plows of the next row, e.g., row 23, which would necessitate removal of one plow in row 23. In this manner an even more vigorous eddy mixing of the sludge carried by the flight 10 of the filter belt may be achieved, causing additional water release.

It will be apparent to those of skill in this art that certain modifications and alterations may be made in the preferred embodiments described hereinbefore. As to all such obvious alterations and modifications, it is desired that they be included within the purview of our invention, which is to be limited only by the scope, including equivalents, of the following, appended claims.

We claim:

1. In combination with a flight of a liquid permeable belt, a plow assembly for elevating and mixing a body of sludge on said flight of the liquid permeable belt, said plow assembly comprising a plow having a body the entirety of which is in the general form of a cone, said cone having a vertical axis and being located with the plane of its base at said belt and a side wall that extends upwardly away from said belt, and means for mounting said plow with respect to said belt, including a post extending horizontally across the path of said belt and a shaft interconnected to said post and extending downwardly from said post, said plow body being attached to said shaft at the downwardly extending end thereof so that in operative position an outer surface of said plow body side wall extends in a continuous, inwardly extending slope from its base at said belt to said shaft, whereby on movement of said belt toward and past said plow, the sludge carried on said belt flight will ride up on the side wall of said conical plow body, thereby elevating and disturbing the flow of sludge and mixing and agitating same to increase the flow of liquid from said sludge to and through said liquid permeable belt.

2. A plow assembly as claimed in claim 1, in which said cone is a right circular cone.

3. A plow assembly as claimed in claim 1, in which there are a multiplicity of said plows spaced along the longitudinal axis of said belt.

4. A plow assembly as claimed in claim 1 in which there are a multiplicity of said plows extending transversely across said belt.

5. A plow assembly as claimed in claim 4, in which the vertical axes of said plows are in substantial alignment.

6. A plow assembly as claimed in claim 11, in which there are at least two rows of plows extending transversely across said belt, the plows in each of said rows being spaced adjacent each other.

7. A plow assembly as claimed in claim 6, in which the plows of the downstream row in the direction of movement of the belt have their vertical axes disposed in the gaps between the plows of the upstream row.

8. A plow assembly as claimed in claim 1, in which said side wall of said cone intercepts the plane of the base of said cone at an angle of about 15°.

9. A plow assembly as claimed in claim 1, in which the said side wall of said cone intercepts the plane of the base of said cone at an angle of about 30°.

10. In combination with a substantially horizontal flight of a liquid permeable belt, plow assembly for elevating and mixing a body of sludge on said substantially horizontal flight of the liquid permeable belt, said plow assembly comprising a plow in the general form of a cone mounted in position to elevate and mix the flow of sludge carried by said belt as the flight of said belt moves in a longitudinal direction beneath said plow, and means for mounting said plow including a post extending horizontally across the path of said belt, a collar mounted on said post, said collar forming therewithin an elongated orifice the axis of which is substantially vertical when said plow is in sludge elevating and mixing position, a shaft positioned within said orifice and having a diameter slightly less than the inside diameter of said collar, so that said shaft may rotate within said orifice and also move axially therewithin, said plow being fixed at one end of said shaft so that when said plow is in sludge elevating and mixing position, said plow depends substantially vertically downward from said collar to said belt and by the weight of said plow and shaft is maintained at or in contact with said belt.

11. A plow assembly as claimed in claim 10, in which said plow is maintained in fixed position relative to said shaft at the lower end thereof by holding means mounted on said shaft on either side of said plow.

12. A plow assembly as claimed in claim 10, in which stop means is provided at the top of said shaft above the orifice of said collar for limiting movement of said shaft and said plow in the direction of said belt.

13. A plow assembly as claimed in claim 10, in which a plurality of said collars, shafts and plows are mounted on said horizontal post, so that a plurality of said plows extend transversely across the path of movement of said belt.

* * * * *